United States Patent [19]

Proctor

[11] 3,958,365
[45] May 25, 1976

[54] HORTICULTURAL AID

[76] Inventor: Athol Thomas Proctor, 111-113 Beleura Hill Road, Mornington, Victoria, Australia

[22] Filed: Sept. 19, 1974

[21] Appl. No.: 507,416

[30] Foreign Application Priority Data
Feb. 22, 1974 Australia............................ 6692/74
Apr. 8, 1974 Australia............................ 7201/74
May 21, 1974 Australia............................ 7625/74

[52] U.S. Cl. ................................ 47/34 R; 47/35; 47/37; 47/9; 47/58
[51] Int. Cl.² .......................................... A01G 9/02
[58] Field of Search ...................... 47/34, 37, 35, 9

[56] References Cited
UNITED STATES PATENTS

| | | | |
|---|---|---|---|
| 1,224,820 | 5/1917 | Williams | 47/34 |
| 1,553,035 | 9/1925 | Eckart | 47/9 |
| 2,192,939 | 3/1940 | Slayter et al. | 47/9 X |
| 2,848,842 | 8/1958 | Tennant | 47/34 |
| 2,949,698 | 8/1960 | Downey et al. | 47/9 |
| 3,102,364 | 9/1963 | Pullen | 47/37 |
| 3,187,463 | 6/1965 | McCollough et al. | 47/34 |
| 3,691,004 | 9/1972 | Werner et al. | 47/9 X |
| 3,842,537 | 10/1974 | Bishop | 47/37 |
| 3,866,352 | 2/1975 | Herveling et al. | 47/34 |

Primary Examiner—Robert E. Bagwill
Attorney, Agent, or Firm—Donald D. Jeffery

[57] ABSTRACT

This invention relates to a horticultural aid in the growing of plants of all kinds in beds, pots, tubs or baskets.

The horticultural aid includes the provision of a loose felted web or organic or inorganic fibres or mixtures thereof, applying an adhesive and/or bonding substance to the web, compressing the web to a thickness and compactness suitable to form a ground cover mat for plant beds or soil cover in tubs or pots. Alternatively the web may, after having the adhesive and/or bonding substance applied thereto be formed into tubs, pots, baskets or liners for baskets and the like in which plants may be grown or propagated.

5 Claims, 11 Drawing Figures

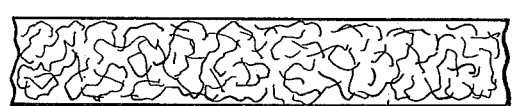
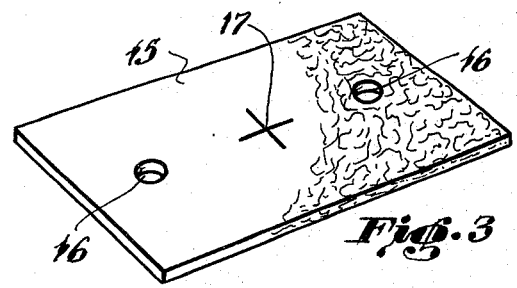
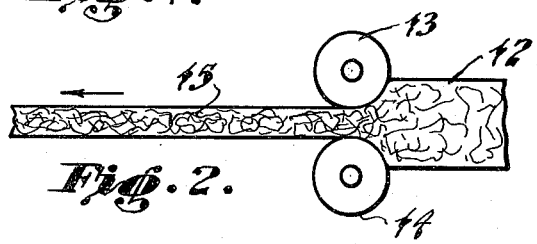
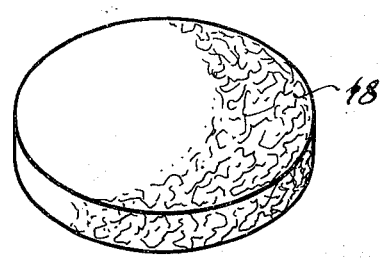
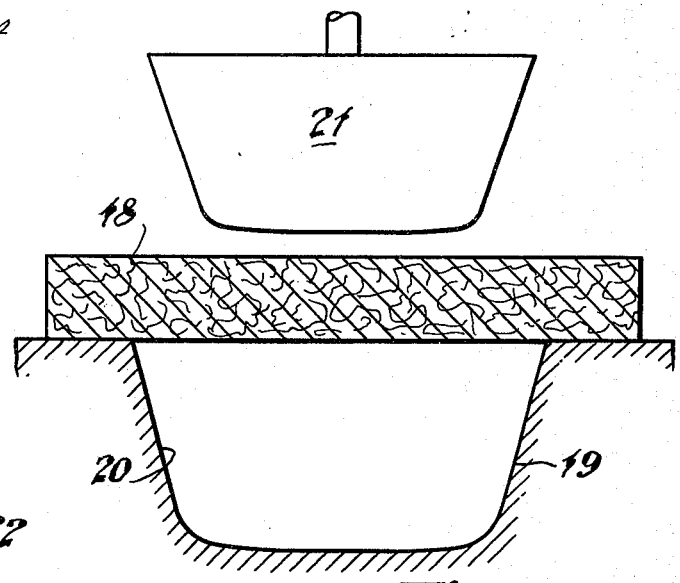
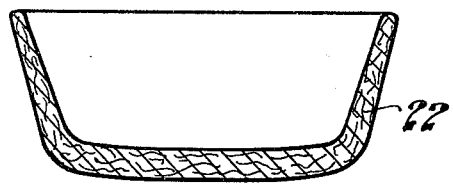
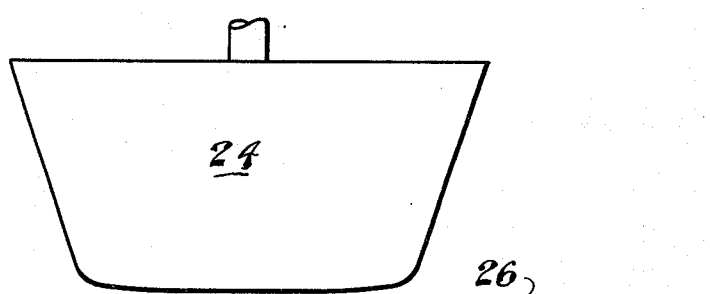
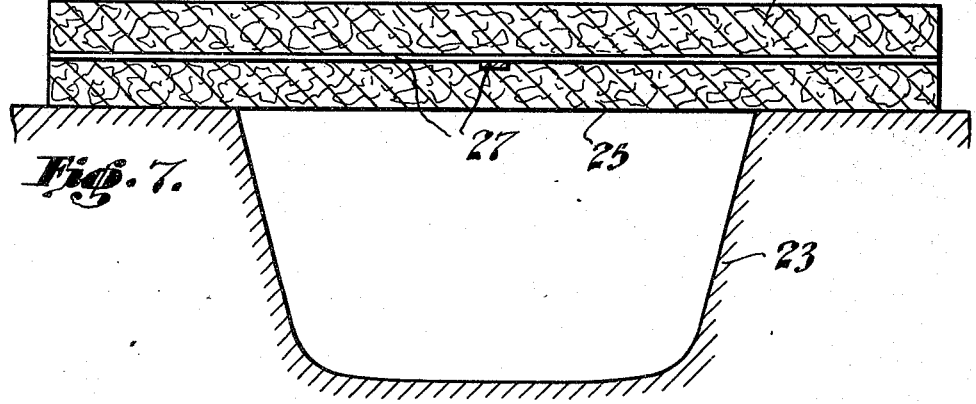

U.S. Patent    May 25, 1976    Sheet 2 of 2    3,958,365
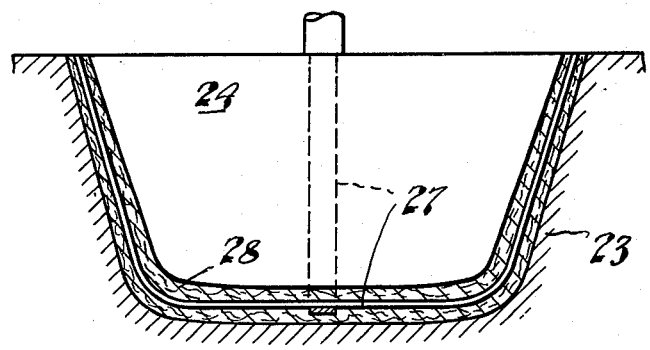
Fig. 8.
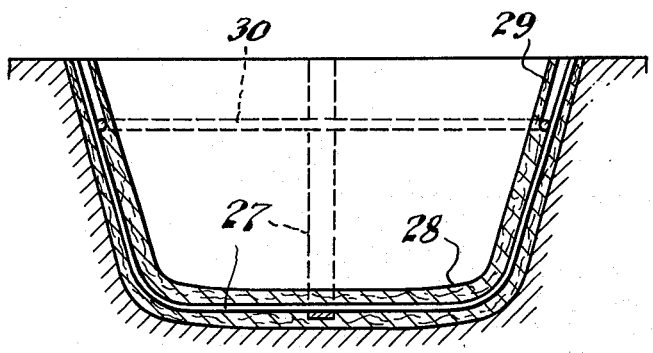
Fig. 9.
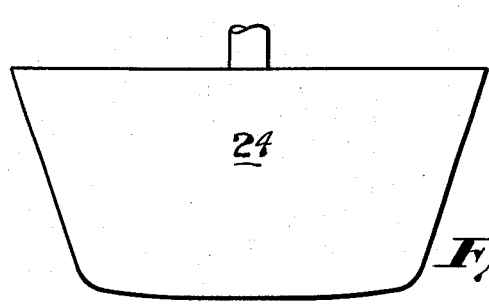
Fig. 10.
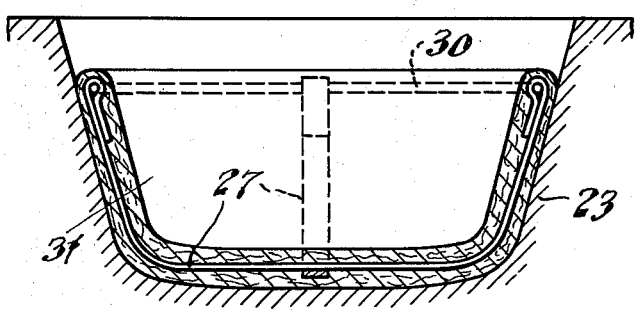
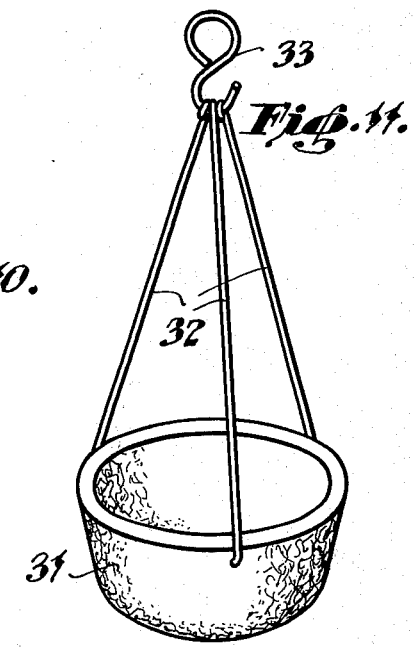
Fig. 11.

HORTICULTURAL AID

In the growing or propagating of plants, shrubs and trees either in beds, tubs or pots, it is a common practice to apply a compost mulch cover on the soil around the plants or the like to conserve ground moisture and to prevent damage, by the wind or sun, to the roots of the plants. Similarly for plants, ferns or other delicate and moisture sensitive plants grown in hanging wire baskets or other suspended perforated containers, it is the practice, to line the basket or container with natural moss which is collected from forest floors or gullies. This moss is intended, by reason of its inherent characteristics, to conserve moisture in a basket or the like and to protect the usually delicate plant growing therein. This natural moss is now commercially in short supply and as a substitute there has been used bark from the Melaleuca or Peperbark trees (native to Australia). This type of bark is also becoming in short supply and furthermore is not completely successful in its intended purpose as a lining for a plant basket or the like.

The principal object of the present invention is to provide a horticultural aid usable as a soil cover around plants or all kinds, either in beds, tubs or pots or is formable into pots, tubs, baskets or liners for baskets or like perforated suspended plant containers and which will efficiently conserve moisture in the soil in which the plants are growing.

According to the invention, the horticultural aid comprises a loosely felted web of organic or inorganic fibrous material having an adhesive and/or bonding substance applied thereto, said web being compressed to a thickness and compactness suitable to form a ground cover mat over a plant bed or cover the soil in tubs or pots. The web may be formed in lenghts as a ground mat or shaped to cover the soil in tubs or pots or may be formed into tubs, pots or baskets or liners for baskets and the like.

The fibrous material may be coconut fibre, sisal, pine needles, wood-wool or any other natural fibre or a mixture of any two or more of these fibres capable of being formed into a loosely felted web. Synthetic fibres of plastic material may also be used or mixed with one or more of the natural fibres.

The web of natural or synthetic fibres or mixtures thereof may be sprayed, dipped or otherwise have applied thereto a natural or synthetic adhesive and/or a bonding agent prior to the web being compressed, for example, between rollers, to compact the web to a desired thickness and density as may be required for the ultimate purpose of the web.

A natural or synthetic latex may be employed as an adhesive bonding agent or suitable plastic materials may be used and where the web is to be subsequently formed or moulded into a pot, tub or liner, a self-hardening or a thermosetting plastic may be employed to provide a required rigidity to the formed product.

Reference will now be made to the accompanying drawings illustrating practical embodiments of the invention. In the drawings:

FIG. 1 is a side elevation of a loosely felted web of a coconut fibre,

FIG. 2 is a diagramatic side elevation of the web being passed between compressing rollers after the web has been sprayed with an adhesive and/or bonding substance.

FIG. 3 is a perspective view of a length of the compressed web to form a ground cover mat.

FIG. 4 is a view of a loosely felted web of coconut fibre arranged to be shaped, after spraying with an adhesive and/or bonding substance, into a flower basket liner, FIG. 5 is a diagramatic view of a die and mould adapted to compress and shape the web shown in FIG. 4 into a basket liner as shown in FIG. 6.

FIG. 7 is a diagramatic view of a die and mould similar to that of FIG. 5 for forming a flower basket of coconut fibre, formed from two superposed layers of loosely felted webs of coconut fibre similar to that shown in FIG. 4 with reinforcing metal strips therebetween, FIG. 8 is a similar view of the die and mould showing the next step in shaping the basket by compacting the webs by the die after the webs have been sprayed with an adhesive and/or bonding substance, FIG. 9 is a similar view of the next step wherein a reinforcing ring is positioned between the inner web and the reinforcing strips at the rim of the basket, FIG. 10 is a similar view to FIG. 9 wherein the outer ends of the reinforcing strip and the web have been turned inwardly and compacted or pressed into shape by the die and FIG. 11 is a perspective view of a completed basket having suspending wires engaging the reinforcing ring of the basket, said wires each being hooked to a suspension hook or ring.

In FIG. 1 of the drawings there is shown the side elevation of a loosely felted web 12 of coconut fibre of a required width and length to form a horticultural ground cover mat. The fibres to form the web are laid on a suitable surface either manually or mechanically and loosely felted to a depth of three inches either by manual or mechanical pressure and vibration. The web of loosely felted fibres is then sprayed with a self-curing natural rubber or synthetic latex emulsion. In view of the loosely felted nature of the web the latex will penetrate the web and form a film on all of the fibres of the web.

The sprayed web 12 is then passed between two compacting rollers 13 and 14 as shown in FIG. 2 which compacts the web 12 to a thickness of between ½ and 1 inch and the contacting fibres in the web will be adhered together by the latex film thereon. The compacted web 15 forms a horticultural ground cover mat, as shown in FIG. 3, which is adapted to be placed over a plant bed as a substitute for a compost mulch for conserving soil moisture, preventing weed growth and protecting the roots of plants growing in the bed. The mat 15 may be provided with apertures 16 for plants to be set and grown. Alternately, intersecting slits, as 17, may be provided to form apertures through which plants may grow.

Covers (not shown) for the soil in pots or tubs may be cut from the web 15, such covers being shaped to suit the pots or tubs whether round or rectangular.

As shown in FIG. 4, a circular web or mat 18 is suitably formed of loosely felted coconut fibre and is then sprayed with a latex emulsion as described with reference to forming the web 12. The web or mat 18 is adapted to form a liner for a wire or like flower basket. The latex sprayed web or mat 18 is then placed on a mould 19 having a recess 20 conforming to the outer surface of the described basket liner. The web or mat 18 is then compressed and compacted into the mould 19 by a die 21, the outer surface of which is adapted to form the inner surface of the basket liner, liner 22 shown in section in FIG. 6. The compressing action of the die 21 effects compaction of the fibres which by reason of the latex film thereon adhere together to form the basket liner 22 of the desired configuration.

As shown in FIGS. 7 to 10 a similar mould 23 and die 24 may be employed to form a basket. In this case and as shown in FIG. 7 two loosely felted circular webs or mats 25 and 26 are formed in a similar manner to the web or mat 18 but of reduced thickness. The webs or mats 25 and 26 are sprayed with latex as previously described, the web 25 positioned over mould 23 and two metal reinforcing strips 27 laid upon the web 25, each strip 27 at right angles to the other and centrally disposed relative to the web 26 and the cavity of mould 23. The second latex sprayed web 26 is then layed upon the strips 27 and web 25 and the die 24 moved into engagement with the mould 23 so that the webs 25 and 26 are compressed together to form a compacted body 28 having the reinforcing strips 27 incorporated therein as shown in FIG. 8.

As shown in FIG. 9, after retraction of the die 24 the upper and inner peripheral portion 29 of the body 28, as formed by web 26, is parted from the strips 27 and part of web 25 and a reinforcing ring 30 inserted, between the portion 29 and strips 27. The said upper portion 29, ends of strips 27 and part of web 25 are then manually turned inwardly over the ring 30 and upon the die 24 re-engaging the mould 23 the upper peripheral edge of body 28 is compressed and compacted, as shown in FIG. 10 to complete the formation of a basket 31. Upon retraction of the die 24 the basket is removed and suspension wires or rods 32, at one end thereof, are hooked or looped into engagement with the ring 30 and the upper ends engaged by a suspension hook 33, as shown in FIG. 11.

Pots or tubs may be moulded in a mould and die arrangement similar to those previously described, and may be formed with or without reinforcement strips or rings and in all cases where further weather proofing and hardening is required to provide rigidity the loosely felted webs for forming the articles may be sprayed with or dipped in acrylic homo polymers, or acrylic co-polymers, polyvinyl acetate or polyvinyl co-polymers as may be selected or required.

Where convenient or necessary the web may be dipped in or sprayed with a thermo-setting plastic prior to moulding into a required article, the forming mould and/or die being treated to thermo-set the plastic and thereby impart required rigidity and strength to the moulded article.

In the embodiments above described the use of coconut fibre has been described and this fibre constitutes the preferred fibre as at the present time it is economical to use, however, should the cost of that fibre become uneconomical it is possible to use sisal, pine needles, wood-wool or any other natural fibre or a mixture of any two or more of these fibres which are capable of being formed into a loosely felted web or mat. It is also envisaged by the invention that synthetic fibres of plastic materials may also be used or mixed with one or more natural fibres.

What I claim is:

1. A horticultural aid comprising a plant basket of fibrous material, said basket being formed from two superposed mats of loosely felted fibrous material consisting principally of coconut fibre to which a waterproof adhesive bonding substance has been applied prior to the mats being compressed and compacted by a die and mould to form and shape the plant backet, reinforcement members positioned between said mats and extending across said mats, and a metal reinforcement ring operatively secured to said metal reinforcement members, said metal reinforcement members and said reinforcement ring being imbedded within said mats.

2. The horticultural aid of claim 1 wherein the ends of said metal reinforceing members are reversely bent over during moulding, said reinforcement ring being positioned within the bent over portions of said members.

3. The method of forming a basket of moisture conserving material for containing a plant grown in soil, comprising the steps of forming two mats of loosely felted fibrous material consisting principally of coconut fibre to which a water proof adhesive bonding substance has been applied, positioning reinforcing strips between said mats, said strips being at substantially right angles to each other and extending across said mats, and compressing said mats with the interposed strips in a mould and die to form a reinforced basket.

4. The method of claim 3 further including the step of inserting a reinforcing ring between the innermost mat and said reinforcing strips, turning the exposed ends of the mats and the strips inwardly to cover said ring, and compressing and compacting said turned in ends over said ring to embed said ring and form said basket.

5. A horticultural aid comprising a plant basket of fibrous material, said basket being formed from compacted fibrous material consisting principally of coconut fibres to which a waterproof adhesive bonding substance has been applied, and reinforcement means embedded within the fibrous material, said reinforcement means comprising a first reinforcing member extending about the upper periphery of the basket and second reinforcing members the ends of which are coupled to the first reinforcing member and which extend across the bottom of the basket.

* * * * *